United States Patent Office
3,658,918
Patented Apr. 25, 1972

3,658,918
FLUOROALKYL ETHERS AND PROCESS FOR THEIR MANUFACTURE
Horst Jaeger, Bettingen, Switzerland, assignor to Ciba Limited, Basel, Switzerland
No Drawing. Filed Nov. 10, 1969, Ser. No. 875,575
Claims priority, application Switzerland, Nov. 25, 1968, 17,515/68
Int. Cl. C07c 43/00
U.S. Cl. 260—614 F
7 Claims

ABSTRACT OF THE DISCLOSURE

Fluoralkyl alkyl ethers, especially perfluoralkyl methyl alkyl ethers are provided. They correspond to the formula $$(H_{2-n}F_{2m+n-1}C_m)—CH_2—O—C_qH_{2q+1}$$

in which $m$ is 4 to 9, $n$ is at most 2 and $q$ is at most 4. These ethers are manufactured by reacting in an anhydrous medium and in the presence of hydrogen halide a corresponding fluoralkanecarboxylic acid and a corresponding dialkyl ether with lithium aluminum hydride. The fluoralkyl alkyl ethers are useful as hydraulic liquids, agents for conferring oleophobic properties or intermediate products, especially for the manufacture of fluoralkyl vinyl ethers.

---

The subject of the invention is fluoralkyl compounds. They correspond to the formula (1)     $(H_{2-n}F_{2m+n-1}C_m)—CH_2—O—C_qH_{2q+1}$ wherein $m$, $n$ and $q$ are positive integers, $m$ is 4 to 9, $n$ is at most 2 and $q$ is at most 4.

According to the invention these fluoroalkyl compounds are obtained by reacting, in an anhydrous medium and in the presence of hydrogen halide, fluoralkanecarboxylic acids of formula (2)     $(H_{2-n}F_{2m+n-1}C_m)—COOH$ wherein $m$ and $n$ have the indicated significance, and dialkyl ethers of formula (3)     $(H_{2p+1}C_p)—O—(C_qH_{2q+1})$ wherein $p$ denotes an integer having a value of 1 to 8 and $q$ has the indicated significance, with lithium aluminium hydride.

Fluoralkanecarboxylic acids of Formula 2 which can be used as starting substances are known. They for example correspond to the formula (4)
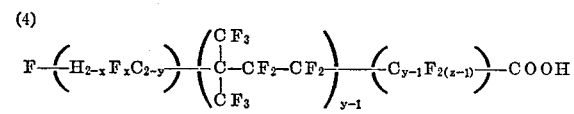

wherein $x$, $y$ and $z$ denote integers, $x$ and $y$ both are at most 2 and the total number of the carbon atoms present in the molecule is at least 5 and at most 10.

Accordingly, the following are for example used as starting substances:

(a) Perfluoralkanecarboxylic acids with an unbranched carbon chain, which correspond to the formula (5)     $F—(CF_2)_{k_1}—COOH$ wherein $k_1$ denotes an integer having a value of 4 to 9, preferably an integer having a value of 6 to 9, especially perfluorocaprylic acid ($C_7F_{15}COOH$).

(b) Fluoralkanecarboxylic acids with an unbranched carbon chain which correspond to the formula (6)     $H—(CF_2)_{k_2}—COOH$ wherein $k_2$ denotes an integer having a value of 4 to 9, preferably an integer having a value of 5 to 8.

(c) Perfluoralkanecarboxylic acids with a chain which is branched at the end, which correspond to the formula (7)
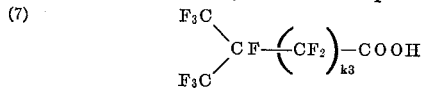

wherein $k_3$ denotes an integer having a value of 1 to 6.

Fluoralkanecarboxylic acids of Formulae 2 and 4 to 7 are known, and such carboxylic acids can furthermore be manufactured according to methods which are in themselves known.

The dialkyl ethers which serve as further starting substances in the present process can also contain branched or unbranched carbon atoms. They can be symmetrical or unsymmetrical and one of the two alkyl residues present in the molecule contains up to 8 carbon atoms and the other up to 4 carbon atoms. As examples, there may here be mentioned methyl butyl ether, ethyl octyl ether and especially dialkyl ethers, of which the alkyl groups contain 2 to 4 carbon atoms, such as dibutyl ether, but above all diethyl ether and diisopropyl ether.

The fluoralkanecarboxylic acids are reacted with the dialkyl ethers in an anhydrous medium. An organic solvent is appropriately used for this purpose, and in particular advantageously an excess of the dialkyl ether, for example the 2-fold to 20-fold amount of dialkyl ether relative to the amount of fluoralkanecarboxylic acid employed. It is furthermore advisable to avoid contact of the reaction medium with air from the very start, for example by displacing the air in the reaction vessel by nitrogen or another inert gas.

Since the reaction takes place according to the equation $2(H_{2-n}F_{2m+n-1}C_m)—COOH+2(H_{2p+1}C_p)—O—$
$(C_qH_{2q+1})+LiAlH_4 \rightarrow 2(H_{2-n}F_{2m+n-1}C_m—CH_2—O—$
$C_qH_{2q+1}+2(H_{2p+1}C_p)—OH+LiAlO_2$

[$LiAlO_2$ is hypothetical, LiOH and Al(OH)$_3$ being produced in the reaction mixture by hydrolysis]

equimolecular amounts of fluoralkanecarboxylic acid and dialkyl ether are required, and one molecule of lithium aluminium hydride is required per two carboxylic acid molecules or ether molecules. It is appropriate to use an excess of this reducing agent, this excess however advantageously being selected to be not greater than ten times the theoretically required amount. The preferred molecular quantity ratio of fluoralkanecarboxylic acid to lithium aluminium hydride is 1:1 to 1:2.

The reduction process according to the present method is carried out in the presence of hydrogen halide, for example hydrogen iodide, hydrogen bromide, hydrogen chloride or especially however hydrogen fluoride. Hydrogen halide can be supplied in the gaseous state to the reaction mixture. It is however advisable, before combining the substances which are to be reacted with one another, to dissolve 0.01 to 5, preferably 0.1 to 2 percent by weight of hydrogen halide in one of these substances, for example in the ether or advantageously in the fluoralkanecarboxylic acid, and thereafter to combine this solution slowly with the dialkyl ether which in turn contains the lithium aluminium hydride. The reaction in general takes place slightly exothermically so that a certain temperature rise results. It is advisable to keep the temperature of the reaction mixture in the range of 10° C. to 30° C., if necessary by cooling or heating.

When the reaction has ended, the fluoralkyl-alkyl ether can be isolated in the usual manner, for example by first decomposing unconsumed lithium aluminium hydride as well as its primary reaction products with water in the cold, separating off the non-aqueous part, optionally using organic solvents, from the aqueous solution and precipitates, and distilling off the organic solvent. The fluoralkyl-alkyl ethers are generally liquid at room temperature and can optionally be purified by vacuum distillation.

The fluoralkyl-alkyl ethers of Formula 1 can for example be used as hydraulic liquids, agents for conferring oleophobic properties, or intermediate products for the manufacture of the most diverse substances such as dyestuffs, agents for conferring oleophobic properties and/or agents for conferring hydrophobic properties, and also microbiocidal agents. In particular, the fluoralkyl-alkyl ethers are suitable for use in further reactions, for example for the manufacture of fluoralkyl vinyl ethers by reaction with chlorine and subsequent splitting off of hydrogen chloride.

It is known that carboxylic acids can be reduced to the corresponding alcohols by means of lithium aluminium hydride. It is furthermore known that using the same reducing agent, perfluoralcohols and perfluoraldehydes are produced from perfluorocarboxylic acids. It is therefore very surprising that fluoralkyl-alkyl ethers are obtained in the same reaction if it is carried out in the presence of hydrogen halide and dialkyl ethers.

Percentages in the examples which follow are percentages by weight.

EXAMPLE 1

5.86 g. (0.155 mol) of lithium aluminium hydride are dissolved in 350 ml. of absolute diethyl ether and initially introduced into a 750 ml. three-necked flask and covered with nitrogen (10 bubbles min.). Thereafter 30 g. of perfluorocaprylic acid ($CF_3$—$(CF_2)_6$—COOH, 0.0724 mol) containing ½% of dissolved hydrogen fluoride gas are dissolved in 100 ml. of diethyl ether and added dropwise in 60 minutes. The reaction temperature hereupon rises from 18° C. to 28° C. The reaction is allowed to finish over the course of 18 hours. The mixture is then cooled by means of an ice/sodium chloride bath and the unreacted lithium aluminium hydride is decomposed with 7 ml. of distilled water.

In the course of this the reaction solution foams greatly. As soon as the reaction has subsided, 30 ml. of 80% strength sulphuric acid are added dropwise. Hereupon a fine, grey, granular precipitate forms. The ether phase is separated from the aqueous phase and the aqueous phase is extracted by shaking three times with 100 ml. of diethyl ether at a time. The ether phases are combined, dried and distilled.

Table II below provides information as to the yield, boiling point and mass spectrum of the n-perfluoroheptyl-methyl-ethyl ether which can be obtained.

A proton resonance spectrum shows [recorded at 60 mc.]

$\underline{CH_2}$—O—$\underline{CH_2}$ at 4.29; $\underline{4.07}$; $\underline{3.9}$; 3.7; 3.61; 3.5 p.p.m. O—$CH_2$—$CH_3$ 1.12; 1.35 p.p.m The procedure adopted in the following Examples 2 to 15 is also analogous to that described in Example 1. The starting products and their amounts are summarised in Table I. The data as to the end products are given in Table II.

TABLE I

| Example No. | Fluoralkanecarboxylic acid G. | Mol | | Dialkyl ether Ml. | | Amount of LiAlH₄ G. | Mol | Hydrogen halide Percent | |
|---|---|---|---|---|---|---|---|---|---|
| 1 | 30 | 0.0724 | Perfluorocaprylic acid | 450 | Diethyl ether | 5.86 | 0.155 | ½ | HF |
| 2 | | | | 400 | Dibutyl ether | | | | |
| 3 | | | | | Diethyl ether | 2.93 | 0.077 | | |
| 4 | | | | | | 5.86 | 0.155 | | |
| 5 | | | | 250 | Ethylbutyl ether | | | | |
| 6 | | | | 400 | Diisopropyl ether | | | | |
| 7 | 30 | 0.0725 | do | 400 | Diethyl ether | 5.86 | 0.155 | 2 | HCl |
| 8 | | | | | | | | 1.5 | HBr |
| 9 | | | | | | | | 5 | HI |
| 10 | | | | | | | | | HF |
| 11 | 19 | 0.0382 | ω-H-perfluorononyl-carboxylic acid | | | 3.71 | 0.0979 | | |
| 12 | 23 | 0.0556 | Perfluor-2-ethyl-hexylcarboxylic acid | | | 4.8 | 0.1263 | 3 | |
| 13 | 2.64 | 0.01 | Perfluorovaleric acid | 150 | | 1.96 | 0.052 | 1 | HF |
| 14 | 3.97 | 0.0126 | Perfluorocaproic acid | 400 | | 3.66 | 0.0965 | | |
| 15 | 20 | 0.0483 | Perfluorocaprylic acid | 260 | n-Octylethyl ether | 5.86 | 0.155 | | |

TABLE II

| Example No. | Fluoroalkyl-alkyl ether | Yield G. | Percent of theory | Boiling point, °C. (uncorrected) | Mass spectrum |
|---|---|---|---|---|---|
| 1 | n-Perfluoroheptylmethyl ethyl ether | 17.5 | 56.5 | 146–148 | M=428; 427=M÷H; 413=M÷$CH_3$; 399=M÷$C_2H_5$; 45=O $CH_2CH_3$; 59=$CH_2$O—$CH_2CH_3$. |
| 2 | n-Perfluoroheptylmethyl n-butyl ether | 1.71 | 5.16 | ¹ 60–62 | M=456; 455=M÷H; 441=M÷$CH_3$; 427=M÷$C_2H_5$; 87=$CH_2$—O—($CH_2$)_3—$CH_3$. |
| 3 | n-Perfluoroheptylmethyl ethyl ether | 12.4 | 40 | ² 60–64 | See Example 1. |
| 4 | | 24.7 | 79.5 | 142–144 | |
| 5 | | 17.4 | 56 | ³ 67–70 | |
| 6 | n-Perfluoroheptylmethyl isopropyl ether | 19.6 | 60.7 | ⁴ 67–69 | M=442; 441=M÷H; 427=442÷$CH_3$; 413=M÷$C_2H_5$; 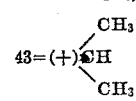 |
| 7 | n-Perfluoroheptylmethyl ethyl ether | 17.4 | 54.6 | 146–148 | See Example 1. |
| 8 | | 13.1 | 41.2 | | |
| 9 | | 17.4 | 54.6 | | |
| 10 | | 7.1 | 22.3 | | |
| 11 | ω-H-perfluoroctylmethyl ethyl ether | 13.9 | 70.9 | ⁴ 88–90 | M=460; 459=M÷H; 455=M÷$CH_3$; 431=M÷$C_2H_5$. |
| 12 | (n-Perfluor-2-ethylpentyl)-methyl ethyl ether | 11.0 | 46.7 | 119–120 | M=428; decomposition series similar to that in Example 1; different intensities. |
| 13 | n-Perfluoropentylmethyl ethyl ether | 1.70 | 61.15 | 95–97 | M=278. |
| 14 | n-Perfluoroheptylmethyl ethyl ether | 2.50 | 60.2 | 106–107 | M=328. |
| 15 | {n-Perfluoroheptylmethyl ethyl ether / Perfluoroctanol} | 3.08 / 0.93 | 15.4 / 4.81 | 103–105 / 146–147 | M=428. / M=400. |

¹ At 14 mm.   ² At 10 mm.   ³ At 13 mm   ⁴ At 12mm

EXAMPLE 16

(16.1) 43 g. (0.1 mol) of perfluoroheptylmethyl ethyl ether are dissolved in 50 ml. of carbon tetrachloride. 11 g. of chlorine are then passed through the solution over the course of 90 minutes in a 200 ml. flask having a gas inlet tube, thermometer, reflux condenser and stirrer. During this time the reaction vessel is irradiated by means of a 250 watt tungsten lamp, in the course of which the temperature rises from 23° C. to 71° C., this being mainly caused by the radiant heat of the incandescent lamp.

The reaction product is fractionally distilled. After separating off the carbon tetrachloride, 31.10 g. of reaction product are obtained. This product cannot be separated into pure fractions, but azeotropic mixtures of varying composition are produced. The following composition of the reaction product amount to 31.10 g. is found by gas-chromatographic separation of analytical amounts:

| | Percent |
|---|---|
| 14.13 g. perfluoroheptylmethyl ethyl ether | 45.43 |
| 10.8 g. perfluoroheptylmethyl α-chlorethyl ether | 34.73 |
| 4.95 g. perfluoroheptylmethyl α-dichloroethyl ether | 15.92 |
| 1.22 g. di-perfluoroheptylmethyl-ethyl-acetate+di-perfluoroheptylmethyl-α-chloroethyl-acetal | 3.92 |

The conversion of the starting material into perfluoroheptylmethyl α-chloroethyl ether is 10.8/46.2=23.37% of theory.

The individual new compounds are identified by the mass spectrum.

(a)  $CF_3(CF_2)_6CH_2O-CHCl-CH_3$
Perfluoroheptylmethyl α-chlorethyl ether
M=462, 464

The intensity ratios agree with the isotope distribution of $Cl^{35}$ and $Cl^{37}$
$447 = M_{462} \div CH_3$
$427 = M_{462} \div Cl_{35}$ In the nuclear resonance spectrum the following can be detected (60 mc.)

$\underline{CH}$—$CH_3$ (with Cl) bands between 5.2 to 4.8 p.p.m.
$CF_2$—$\underline{CH_2}$—O bands between 4.3 to 3.5 p.p.m.
$CH$—$\underline{CH_3}$ bands between 1.3 to 1.45 p.p.m.

(b)  $CF_3(CF_2)_6CH_2-O-CCl_2CH_3$
Perfluoroheptylmethyl α-dichlorethyl ether
461=496—Cl
460=496—HCl
M=496+the isotope peaks expected for 2 Cl In the nuclear resonance spectrum the following can be detected (60 mc.)
$CF_2$—$\underline{CH}$—O bands between 4.8 to 3.8 p.p.m.
—$Cl_2\underline{CH_3}$ 2.08 p.p.m.

(c) Acetals as secondary reaction products $CF_3(CF_2)_6$—$CH_2O$
$CF_3(CF_2)_6$—$CH_2O$ $>CH-CH_3$
M=826
825=826÷H
811=826÷$CH_3$
427=826÷399
M:399

$CF_3(CF_2)_6CH_2$—O
$CF_3(CF_2)_6CH_2$—O $>C-(Cl)-CH_3$
M=860+862
859=860÷H
825=860÷$Cl_{35}$(827)
810=860÷$CH_3Cl_{35}$(812)

The production of acetals can be reproduced by the following equation:

R—$CH_2$—O—CClH—$CH_3$+R—$CH_2OCH_2CH_3$ →
(R—$CH_2O)_2CHCH_3$+$ClCH_2CH_3$

It is known that in an ether, chlorine in the α-position can be easily split off.

(16.2) 0.5 g. of perfluoroheptylmethyl α-chlorethyl ether is mixed with 10 ml. of 25% strength ammonia and shaken. The lower phase is separated from the aqueous phase, twice washed with 1 ml. of water, taken up in ether and dried with a little sodium sulphate (anhydrous). The ether is evaporated and a mass spectrum of the ether-free residue (0.3 g.) is recorded. This shows:

Perfluoroheptylmethyl vinyl ether $CF_3(CF_2)_6CH_2-O-CH=CH_2$

M 426

$413 = 426 \div CH_2$
$399 = 426 \div CH=CH_2$

The same result is obtained if 0.5 g. of perfluoroheptylmethyl α-chlorethyl ether, in a long tube sealed at the bottom, is heated to 250° C. in an oil bath for 30 minutes, or if in the above experiment 10 ml. of 30% strength potassium hydroxide solution are used instead of 10 ml. of 25% strength ammonia.

EXAMPLE 17

Filter paper is impregnated with a 20% solution of perfluoroheptylmethyl ethyl ether, manufactured according to Example 1, in ethyl acetate and allowed to dry for 10 minutes at 50° C. in a vacuum cabinet. The filter paper shows a weight increase of 5% and is not soiled by fatty substances. Such papers impregnated with perfluoralkylmethylalkyl ethers can serve as barrier layers in packaging material which is used to contain greasy substances.

EXAMPLE 18

Perfluoroheptylmethyl ethyl ether manufactured according to Example 1 is circulated for 8 hours at 700° C. in a circulation apparatus which contains a steel spiral (2 mm. diameter) heated to 700° C. and also contains a spiral (2 mm. diameter) cooled to 0° C. The material can be recovered unchanged apart from the losses conditioned by the experimental system. The material is not discoloured. The gas chromatogram and mass spectrum of the starting material and of the circulating product are identical.

I claim:

1. A process for the manufacture of a fluoralkyl alkyl ether of the formula $$(H_{2-n}F_{2m+n-1}C_m)-CH_2-O-C_qH_{2q+1}$$

in which $m$, $n$ and $q$ denote positive integers, $m$ is 4 to 9, $n$ is at most 2 and $q$ is at most 4, which comprises reacting in an anhydrous medium in the absence of air at a temperature of 10 to 30° C., a fluoralkanecarboxylic acid of the formula $$(H_{2-n}F_{2m+n-1}C_m)-COOH$$

in which $m$ and $n$ have the meanings above, and 2 to 20 fold amount relative to the amount of fluoroalkane carboxylic acid employed of a dialkyl ether of the formula $$(H_{2p+1}C_p)-O-(C_pH_{2q+1})$$

in which $p$ is an integer having a value of 1 to 8 and $q$ has the above meaning, with lithium aluminum hydride in the presence of hydrogen halide.

2. A process according to claim 1, which comprises using as starting substance a fluoroalkane carboxylic acid of the formula $$F-\left(H_{2-x}F_xC\right)_{2-y}-\left(\begin{array}{c}CF_3\\|\\C-CF_2CF_2\\|\\CF_3\end{array}\right)_{y-1}-\left(C_{z-1}F_{2(z-1)}\right)-COOH$$

in which $x$, $y$ and $z$ are integers, $x$ and $y$ are each at most 2, $z$ is 1 to 9 and the total number of carbon atoms in the molecule is at least 5 and at most 10.

3. A process according to claim 1, which comprises using as starting substance a fluoroalkane carboxylic acid of the formula $$F-(CF_2)_{k_1}-COOH$$

in which $k_1$ is an integer having a value of 4 to 9.

4. A process according to claim 1, which comprises using as starting substance a fluoroalkane carboxylic acid of the formula $$H-(CF_2)_{k_2}-COOH$$

in which $k_2$ is an integer having a value of 4 to 9.

5. A process according to claim 1, which comprises using as starting substance a dialkyl ether of which the alkyl groups each contain 2 to 4 carbon atoms.

6. A process according to claim 1, which comprises reacting perfluorocaprylic acid and diethyl ether.

7. A process according to claim 1, which comprises using as starting substance a fluoroalkane carboxylic acid of the formula

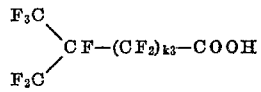

in which $k_3$ is an integer having a value of 1 to 6.

References Cited

UNITED STATES PATENTS 3,291,844    12/1966    Watson _____ 260—614 F
3,420,840    1/1969    Tesoro et al. ____ 260—614 F X

OTHER REFERENCES

Lu et al., Chem. Abstr., 48 1584ᵇ (Anesthesiology 14, 466–72 (1953)).

Henne et al., J. Am. Chem. Soc., 72, pp. 4378–4380, 1950.

HOWARD T. MARS, Primary Examiner

U.S. Cl. X.R.

117—152, 154; 252—77